United States Patent
Fujii et al.

(10) Patent No.: US 7,110,392 B1
(45) Date of Patent: Sep. 19, 2006

(54) COMMUNICATING METHOD, TRANSMITTING APPARATUS, AND RECEIVING APPARATUS

(75) Inventors: Noboru Fujii, Kanagawa (JP); Kazuhiro Hara, Kanagawa (JP); Hidetaka Izumiyama, Kanagawa (JP)

(73) Assignees: Sony Corporation, Tokyo (JP); JSAT Corporation, Tokyo (JP)

( * ) Notice: Subject to any disclaimer, the term of this patent is extended or adjusted under 35 U.S.C. 154(b) by 1016 days.

(21) Appl. No.: 09/605,498

(22) Filed: Jun. 28, 2000

(30) Foreign Application Priority Data

Jun. 30, 1999 (JP) ............................. P11-186493

(51) Int. Cl.
H04L 12/28 (2006.01)

(52) U.S. Cl. ..................... 370/352; 370/389; 370/474

(58) Field of Classification Search .............. 370/231, 370/235, 352, 389, 392, 395.1, 400, 401, 370/470–474
See application file for complete search history.

(56) References Cited

U.S. PATENT DOCUMENTS

| | | | | |
|---|---|---|---|---|
| 5,699,521 A | * | 12/1997 | Iizuka et al. | 709/240 |
| 6,385,647 B1 | * | 5/2002 | Willis et al. | 709/217 |
| 6,389,453 B1 | * | 5/2002 | Willis | 709/204 |
| 6,493,538 B1 | * | 12/2002 | Jabbarnezhad | 455/12.1 |
| 6,519,243 B1 | * | 2/2003 | Nonaka et al. | 370/338 |
| 6,519,651 B1 | * | 2/2003 | Dillon | 709/250 |

OTHER PUBLICATIONS

Duros, Fujit et al: "A Link Layer Tunneling Mechanism for Uni-directional Links draft-ietf-udlr-11tunnel-02.txt" IETF Draft UDLR Group, 'Online! Jun. 24, 1999 (Jun. 24, 1999), XP002331853 (pp. 1-19).
Izumiyama et al: "An IP tunneling approach for Uni-directional Link routing draft-ietf-udlr-wide-tunnel-00.txt" IEFT Draft UDLR Group, 'Online! Nov. 1997 (Nov. 1997), XP002331854 (pp. 1-8).
Fujii N et al: "Implementation and evaluation of satellite Internet system" Internet Workshop, 1999. IWS 99 Osaka, Japan Feb. 18-20, 1999, Piscataway, NJ, USA, IEEE, US Feb. 18, 1999 (Feb. 18, 1999), pp. 215-220, XP010365609 (pp. 215-220).
E. Duros and W. Dabbous: "Supporting Unidirectional Links in the Internet" In Proceedings of the $1_{st}$ International Workshop on Satellite-Based Services, 'Online! Nov. 1996 (Nov. 1996), XP002331855 (pp. 1-6).

* cited by examiner

*Primary Examiner*—Huy D. Vu
*Assistant Examiner*—Roberta A. Shand
(74) *Attorney, Agent, or Firm*—Bell, Boyd & Lloyd LLC

(57) ABSTRACT

A path control packet is sent from a router to a receiver. The receiver capsulates the received packet and transmits a capsulated IP packet to a feed via a ground line. The feed extracts the path control packet by decapsulation and transmits the packet to a router. At the same time, path control information is sent to a satellite line. The router processes the packet as if the path control information from the router reached via the satellite line. When a receiver receives a packet via the satellite line, it transmits the packet as a packet to a router. This router processes the packet as if the path control information from the router reached via the satellite line.

5 Claims, 3 Drawing Sheets

COMMUNICATING METHOD, TRANSMITTING APPARATUS, AND RECEIVING APPARATUS

BACKGROUND OF THE INVENTION

1. Field of the Invention

The invention relates to a communicating method, a transmitting apparatus, and a receiving apparatus, in which a unidirectional communication medium such as a digital broadcasting is made to look like a bidirectional communication medium, thereby making it possible to perform a path control in which a bidirectional communication medium is used as a prerequisite.

2. Description of the Related Art

For example, communication using a communication satellite or a partial CATV as a medium is a unidirectional communication and an application, a communication protocol, and the like on a satellite broadcasting have been designed in consideration of a unidirectional topology. In recent years, a method of sending a packet of an IP (Internet Protocol) to a satellite network has been tried in association with the spread of the Internet.

The application on the Internet, however, has been usually developed in consideration of only the bidirectional communication medium such as Ethernet, FDDI (Fiber Distributed Interface: optical LAN of 100 Mbps), or the like. Therefore, under an environment using the unidirectional communication medium like a satellite broadcasting, if the application used on the Internet is used, such a trouble that the communication cannot be properly performed occurs.

When a router is connected to a satellite line, since a path control program operating at present on the router has been designed on the assumption that the line to which the router is connected is a bidirectional communication medium, a problem occurs. A path control packet transmitted by a certain router has to directly arrive at an interface of an adjacent router connected to the same segment as that of an interface to which such a router generated the packet. Since the satellite line is unidirectional, however, although a packet can be sent from the transmitting side to the receiving side via the satellite line, a packet cannot be transmitted from the receiving side to the transmitting side via the satellite line. Since the router cannot bidirectionally communicate via the satellite line, the communication using the satellite line cannot be correctly performed. In the case where the unidirectional communication medium like a satellite line is used as mentioned above, a problem occurs in the communication of the router or node on which the path control program operates.

OBJECT AND SUMMARY OF THE INVENTION

It is, therefore, an object of the invention to provide a communicating method whereby when a unidirectional communication medium is used, a router or node on which a path control program operates is enabled to virtually and bidirectionally communicate via the communication medium and to provide a transmitting apparatus and a receiving apparatus for realizing such a communicating method.

To accomplish the above object, according to a preferred aspect of the invention, there is provided a communicating method in a network in which a feed and receivers are connected via a unidirectional line and the feed and the receivers are respectively connected to a bidirectional line via routers, comprising the steps of:

allowing a first router to transmit a first packet including path control information to a first receiver;

allowing the first receiver to transmit a second packet obtained by capsulating the first packet to a first interface of the feed via the first router, the bidirectional line, and a second router;

allowing the feed to extract the first packet by decapsulating the second packet, transmit the first packet to the second router from a second interface, and transmit the first packet to a third receiver from a third interface via the unidirectional line; and allowing the third receiver to transmit the first packet to a third router.

According to another aspect of the invention, there is provided a transmitting apparatus having first, second, and third interfaces, wherein the transmitting apparatus:

is connected to a first interface of a router via the first interface and a bidirectional line;

is connected to a second interface of the router via the second interface and the bidirectional line;

is connected to a receiver via the third interface and a unidirectional line;

receives a capsulated packet including path control information via the bidirectional line, the router, and the first interface from the receiver;

decapsulates the capsulated packet, transmits the path control information extracted due to the decapsulation to the router via the second interface and the bidirectional line, and transmits the path control information to the receiver via the third interface and the unidirectional line.

According to further another aspect of the invention, there is provided a receiving apparatus having first and second interfaces, wherein the receiving apparatus:

is connected to a feed via the first interface and a unidirectional line;

is connected to a bidirectional line via the second interface and a router;

receives a packet including path control information from the router via the second interface;

capsulates the received packet and transmits the capsulated packet to the feed via the second interface, the router, and the bidirectional line; and receives path information from the feed via the unidirectional line and the first interface.

According to the invention, each of the feed and receiver has the unidirectional line and the interface for connecting to the router, the feed has the decapsulating function, and the receiver has the capsulating function, so that the unidirectional line can be made to look like a bidirectional line and a path control can be performed without a trouble.

The above and other objects and features of the present invention will become apparent from the following detailed description and the appended claims with reference to the accompanying drawings.

DETAILED DESCRIPTION OF THE PREFERRED EMBODIMENT

Figure 1:
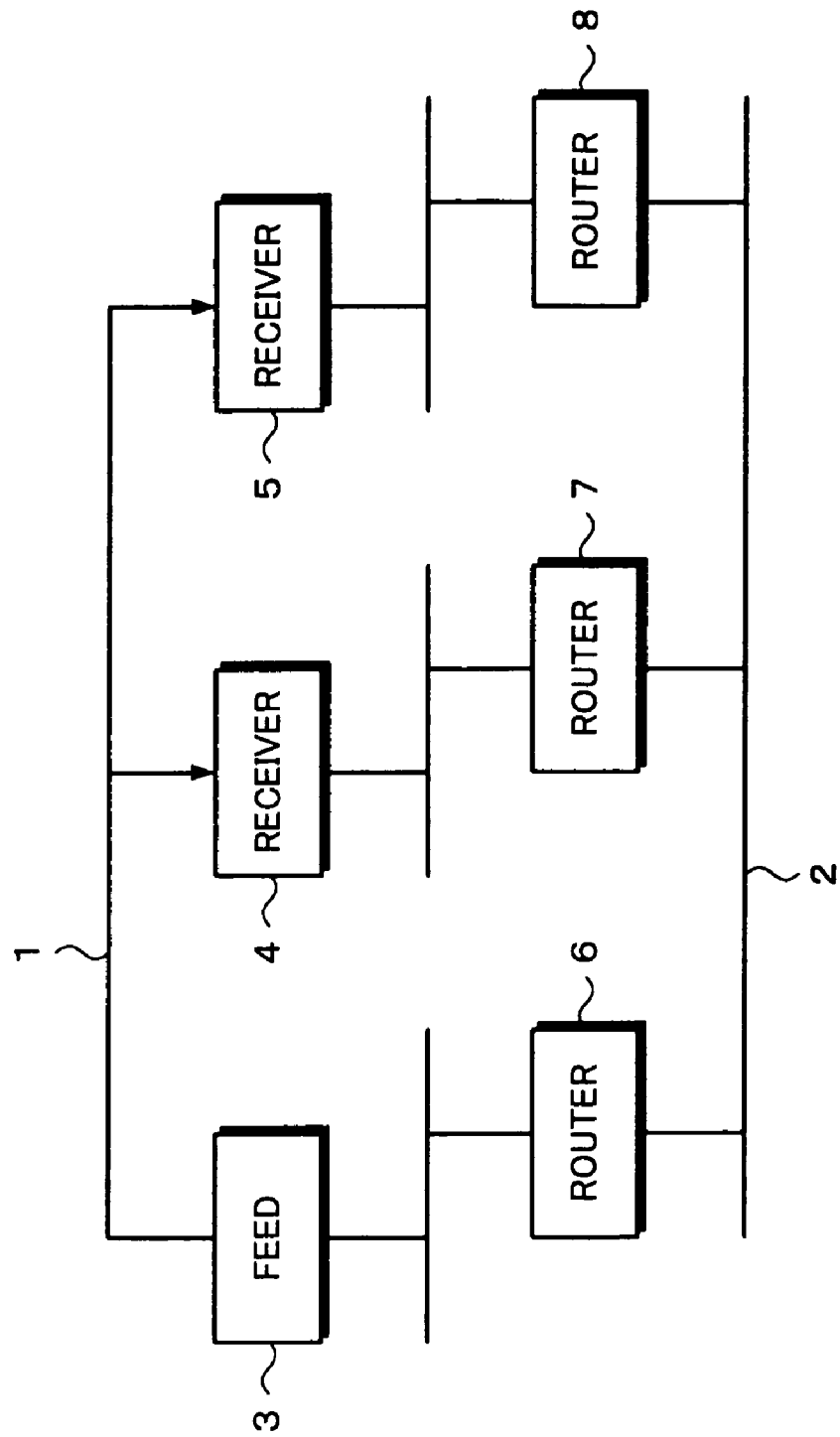
FIG. 1 is a block diagram showing a form of a network in an embodiment of the invention.

An embodiment of the invention will now be described hereinbelow with reference to the drawings. FIG. 1 shows a topology (form) of a network of the embodiment. A unidirectional communication medium, for example, a satellite line 1 and a bidirectional communication medium, for example, a ground line 2 exist as communication media. In the embodiment, communication of an IP (Internet Protocol) packet can be performed via the satellite line 1.

As is well known, a layer structure of TCP/IP comprises a network interface layer, an Internet layer, a transport layer, and an application layer. The network interface layer corresponds to a physical layer and a data link layer in an OSI reference model. A protocol of the physical layer transmits and receives a packet by a packet. The Ethernet corresponds to the physical layer and the data link layer. An IP is included in the Internet layer. The IP determines a path on the basis of the received IP address. The IP adds an IP header. A large quantity of information such as IP addresses of a transmission host and a reception host and the like is included in the IP header. An address conversion between an Ethernet address and an IP address is performed between the network interface layer and the Internet layer.

A feed 3 as a transmitter and receivers 4 and 5 as receiving apparatuses are connected to the satellite line 1 and ground line 2. Although one feed and two receivers are connected in the example of FIG. 1, more feeds and receivers can be connected. More specifically speaking, the satellite line 1 is constructed by a transmitting antenna, a satellite (communication satellite or broadcasting satellite), a receiving antenna, and the like. More specifically speaking, the ground line 2 is constructed by a B-ISDN (Broadband-ISDN), a high speed digital exclusive line, an N-ISDN (Narrowband-ISDN), or an analog telephone network. The receivers 4 and 5 are enabled to have a function for receiving the satellite broadcast in addition to the function as a receiver for data communication.

The feed 3 has a third interface for connecting to the satellite line 1 in addition to first and second interfaces for connecting to the ground line 2 (router). The receivers 4 and 5 have the first interface for connecting to the satellite line 1 and the second interface for connecting to the ground line 2 (router). The feed 3 and receivers 4 and 5 are apparatuses of the bridge type and each of them relays the packet received from one interface to the other interface. The feed 3 and receivers 4 and 5 are connected to the ground line 2 via the interfaces and routers 6, 7, and 8, respectively.

Each of the routers 6, 7, and 8 relays the packet on the ground line 2. An LAN (Ethernet, ATM (Asynchronous Transfer Mode)-LAN, etc.) is connected to each of the routers 6, 7, and 8. A path control program which is specified by the IP is equipped for the routers 6, 7, and 8 and path control information is processed on the basis of such a program, and a path control such as to decide a communication path of the packet or the like is performed.

As mentioned above, in the case where the satellite line 1 as a unidirectional line and the ground line 2 as a bidirectional line mixedly exist, since the path control program which operates in the routers 6 to 8 does not correctly operate, a method of making the satellite line 1 look like a bidirectional communication medium needs to be devised. This method is called a UDLR (Uni-Directional Link Routing).

Figure 2:
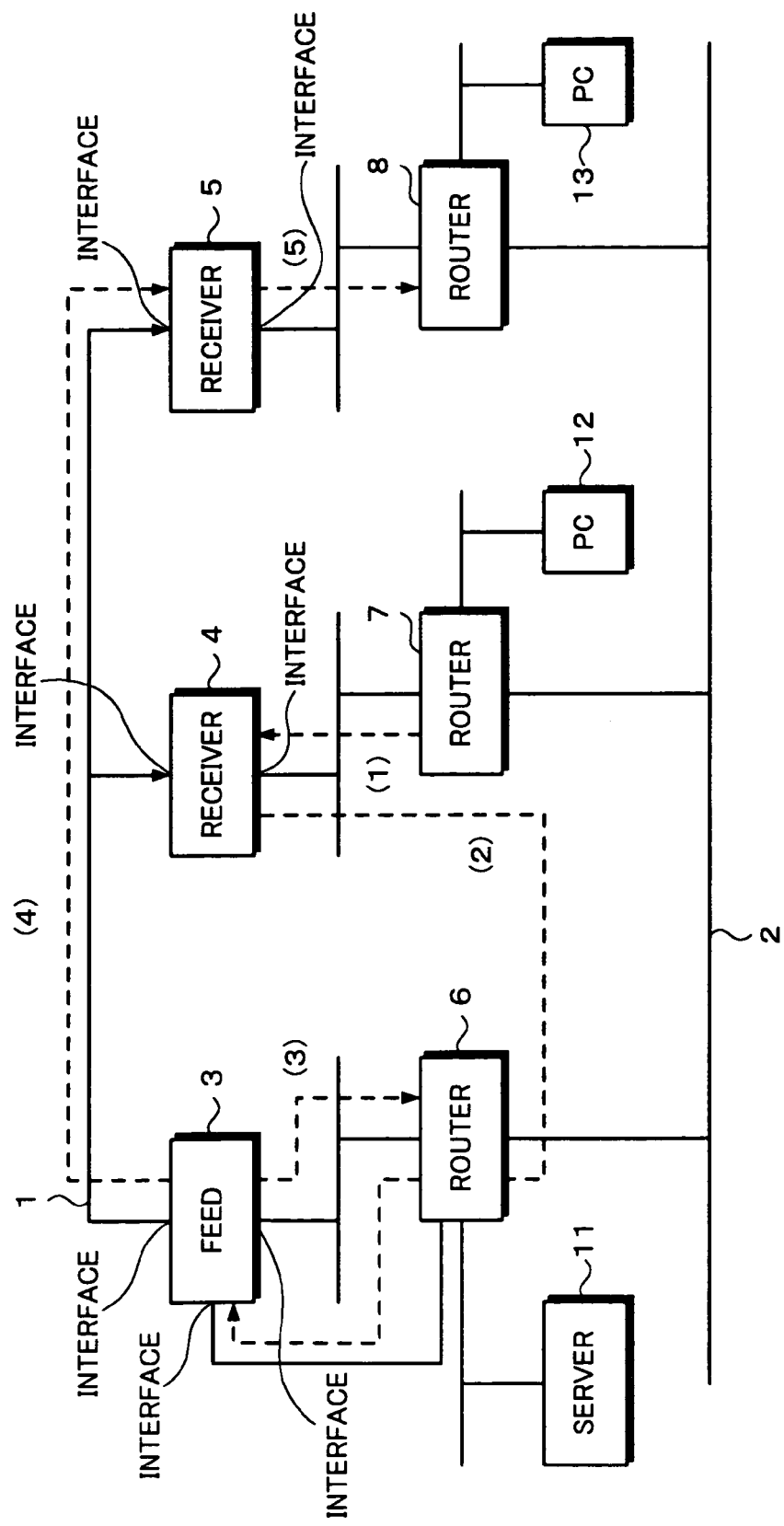
FIG. 2 is a block diagram for explaining communication of a packet including path control information in the embodiment of the invention.

The UDLR in case of applying the invention to a network topology similar to FIG. 1 will now be described with reference to FIG. 2. In the routers 6 to 8, the path control program operates and the path control information is exchanged between the adjacent routers. The router 6 connected to the feed 3 transfers the path control information to the routers 7 and 8 via the satellite line 1. In case of the client server type system, a server 11 is connected to the router 6 and client machines 12 and 13 are connected to the routers 7 and 8, respectively. Generally, since the path control program has been designed on the assumption that the line is bidirectional, the path control information is sent to the satellite line side from the routers 7 and 8. That is, the path control packet is sent to one interface of each of the receivers 4 and 5 from the routers 7 and 8, respectively.

Figure 3:
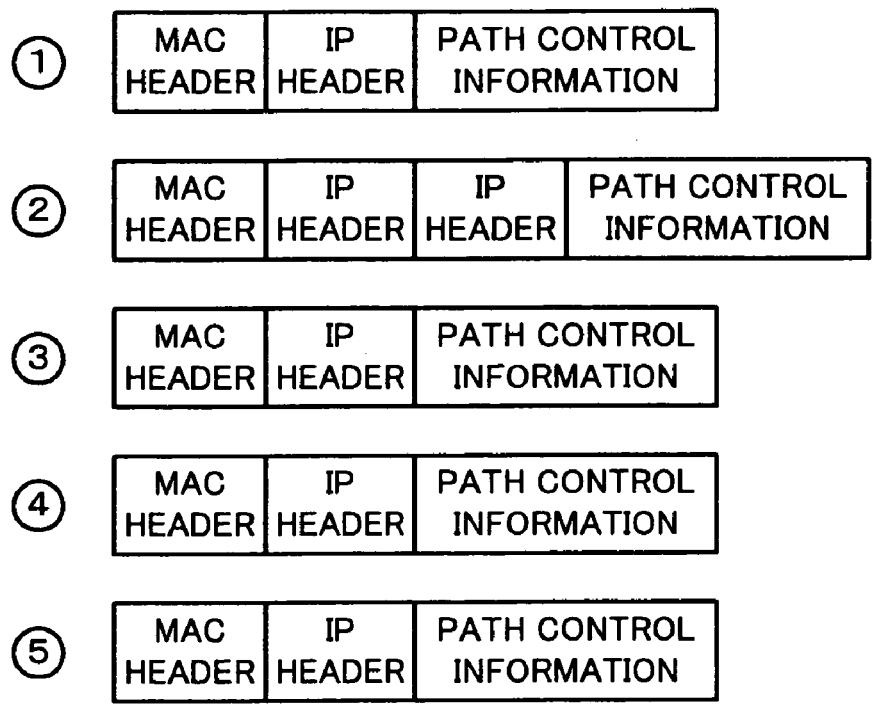
FIG. 3 is a diagram schematically showing a construction of the packet.

FIG. 3 shows a path control packet (1) which is sent from the routers 7 and 8 to the receivers 4 and 5. In the packet (1), an MAC (Media Access Control) header is added to the head, an IP header is subsequently added, and the path control information is located after that. The MAC header has a length of, for example, 14 bytes and a transmitting source address of 6 bytes, a destination address of 6 bytes, and information showing a type of packet of 2 bytes are included. Those addresses are physical addresses on the LAN, for example, on the Ethernet. An IP address of a transmitting source (for example, client machine 12), an IP address of a destination (server 11), and the like are included in the IP header.

For example, the path control information packet (1) sent from the router 7 is received by one interface of the receiver 4. Since the receiver 4 cannot send the packet to the satellite line 1, the receiver capsulates the received path control information packet (1) to the IP packet and transmits a capsulated IP packet (2) to the first interface of the feed 3 from one interface via the router 7, ground line 2, and router 6. As shown in FIG. 3, the packet (2) is obtained by capsulating the IP header and path control information of the packet (1) as a path control packet.

When the feed 3 receives the packet (2) by the first interface, this feed decapsulates the IP packet, extracts a path control packet (3), and sends the path control packet (3) to the router 6 from the second interface. At the same time, the feed 3 sends the path control information extracted at the time of decapsulation to the satellite line 1 via the third interface. As shown in FIG. 3, the path control packets (1), (3), and (4) have the same packet construction.

Figure 4:
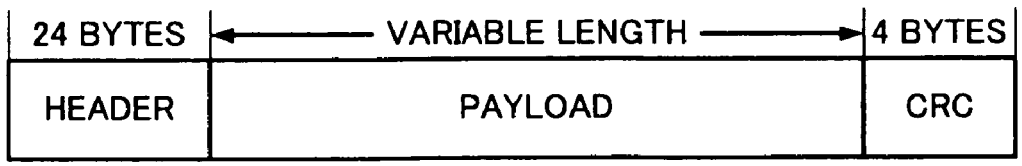
FIG. 4 is a diagram schematically showing the construction of the packet which is transmitted via a satellite line.

When the packet (4) is transmitted via the satellite line 1, it is transmitted in a form of, for example, a section table of MPEG. FIG. 4 shows a packet construction of a table in case of transmitting the packet (4) via the satellite line 1. A header of 24 bytes is located at the head, a payload of a variable length is subsequently located, and a CRC (4 bytes) for error detection is finally added. A packet of the packet (4) is inserted as a payload. The packet shown in FIG. 4 is divided into a transport packet and transmitted via the satellite line 1. A transmitting source MAC address, a destination MAC address, and the like are included in the header.

The router 6 receives the path control packet (3) by one interface. When the router 6 receives this packet, it processes the packet as if the path control information from the router 7 reached via the satellite line 1.

When the packet (4) transmitted via the satellite line 1 is received by the receiver 5 via one interface, the receiver 5 transmits the packet (4) received from the other interface as a packet (5) to the router 8. As shown in FIG. 3, the packet (4) and the packet (5) have the same packet construction. When the router 8 receives the packet (5) by one interface, it processes the packet as if the path control information from the router 7 reached via the satellite line 1.

As mentioned above, by the communication via the ground line 2, the network application such as a path control program on the router can be used as it is by using the satellite line 1 as a bidirectional communication medium. Communication is performed between the feed 3 and the receiver 4 and/or 5 via the communication path established according to the path control information. As a kind of this communication, bidirectional communication by a unicast, multipoint communication by an IP multicast, or the like is possible. This communication is performed via the unidirectional line 1 or bidirectional line 2 on the basis of the path control information.

Other several systems have been proposed as systems of UDLR. In an IETF (Internet Engineering Task Force), a model in which the router itself having the interface of the unidirectional line performs the capsulation and decapsulation and the same function as the operation of the invention is provided.

According to this method, however, since the UDLR also needs to operate on the router by which the path control protocol operates, use efficiency of the user deteriorates. For example, in the invention, by separating the operation of the path control protocol of the router and the function of the UDLR, the router which can be used by the user is not limited. However, in the case where the UDLR is realized on the router, the function of the router to be used is influenced by the specifications of the apparatus. It is usually convenient if the function of the router itself and the function for making the unidirectional line look like a pseudo bidirectional line by the UDLR are separated.

Although the satellite line has been mentioned as an example of the unidirectional line in the above description, the invention is not limited to it. For instance, the invention can be applied to a unidirectional line by a CATV (Cable Television) or a ground wave.

An interface which can set the feed and monitor a status can be also added independently of the first, second, and third interfaces of the feed. Security of the apparatus can be improved by providing another interface different from that of the processing system of the other IP packet.

According to the invention as described above, the router or node on which the path control program operates can virtually and bidirectionally perform communication via the unidirectional communication medium like a satellite line. Therefore, the path control is not obstructed by the path control program designed on the assumption that the bidirectional line is used.

The present invention is not limited to the foregoing embodiment but many modifications and variations are possible within the spirit and scope of the appended claims of the invention.

What is claimed is:

1. A communicating method in a network in which a feed and receivers are connected via a unidirectional line and the feed and the receivers are respectively connected to a bidirectional line via routers, comprising the steps of:

allowing a first router to transmit a first packet including a path control information and an IP header to a first receiver;

allowing said first receiver to transmit a second packet obtained by capsulating the path control information and the IP header of said first packet as a path control packet to a first interface of said feed via said first router, said bidirectional line, and a second router;

allowing said feed to extract said first packet by decapsulating said second packet, transmit said first packet to said second router from a second interface, and transmit said first packet to a second receiver from a third interface via said unidirectional line; and allowing said second receiver to transmit said first packet to a third router;

wherein, in said first packet, a MAC header is added to the head, the IP header is subsequently added, and the path control information is located after said IP header.

2. A method according to claim 1, further comprising the step of performing communication between said feed and said receiver via a communication path established according to said path information.

3. A method according to claim 1, wherein said unidirectional line is a satellite line.

4. A transmitting apparatus in a network in which a feed and receivers are connected via a unidirectional line and the feed and the receivers are respectively connected to a bidirectional line via routers, the transmitting apparatus comprising:

means for allowing a first router to transmit a first packet including a path control information and an IP header to a first receiver;

means for allowing said first receiver to transmit a second packet obtained by capsulating the path control information and the IP header of said first packet as a path control packet to a first interface of said feed via said first router, said bidirectional line, and a second router;

means for allowing said feed to extract said first packet by decapsulating said second packet, transmit said first packet to said second router from a second interface, and transmit said first packet to a second receiver from a third interface via said unidirectional line; and means for allowing said second receiver to transmit said first packet to a third router;

wherein, in said first packet, a MAC header is added to the head, the IP header is subsequently added, and the path control information is located after said IP header.

5. An apparatus according to claim 4, wherein said unidirectional line is a satellite line.

* * * * *